(12) United States Patent
Zinser

(10) Patent No.: US 10,790,647 B2
(45) Date of Patent: Sep. 29, 2020

(54) STRIPPING PLIERS

(71) Applicant: WEZAG GmbH Werkzeugfabrik, Stadtallendorf (DE)

(72) Inventor: Roman Zinser, Neustadt (DE)

(73) Assignee: WEZAG GMBH WERKZEUGFABRIK, Stadtallendorf (DE)

( * ) Notice: Subject to any disclaimer, the term of this patent is extended or adjusted under 35 U.S.C. 154(b) by 642 days.

(21) Appl. No.: 15/159,968

(22) Filed: May 20, 2016

(65) Prior Publication Data

US 2016/0344172 A1 Nov. 24, 2016

(30) Foreign Application Priority Data

May 22, 2015 (EP) .................................... 15168865

(51) Int. Cl.
*H02G 1/12* (2006.01)
(52) U.S. Cl.
CPC ................................ *H02G 1/1212* (2013.01)
(58) Field of Classification Search
CPC .... H02G 1/005; H02G 1/1212; H02G 1/1241; B25B 7/00; B25B 27/146
See application file for complete search history.

(56) References Cited

U.S. PATENT DOCUMENTS

| | | | | |
|---|---|---|---|---|
| 4,485,696 A | * | 12/1984 | Bieganski | ............ H02G 1/1212 30/90.1 |
| 4,892,015 A | | 1/1990 | Beetz et al. | |
| 5,572,911 A | * | 11/1996 | Schmode | ............. H02G 1/1212 81/9.43 |
| 5,724,870 A | | 3/1998 | Wiebe et al. | |
| 5,724,871 A | * | 3/1998 | Wall | ..................... H02G 1/1212 81/9.43 |
| 7,360,472 B2 | | 4/2008 | Krampe et al. | |

(Continued)

FOREIGN PATENT DOCUMENTS

| | | |
|---|---|---|
| DE | 37 33 358 | 3/1989 |
| DE | 42 05 194 | 7/1993 |

(Continued)

OTHER PUBLICATIONS

Office Action dated Nov. 15, 2019 for Japanese Application No. 2016-102844.

*Primary Examiner* — David B. Thomas
(74) *Attorney, Agent, or Firm* — Thomas | Horstemeyer, LLP

(57) ABSTRACT

The invention relates to stripping pliers (1). During a cutting stroke of the stripping pliers (1), cutting blades (14a, 14b) radially cut into an insulation of a cable (13). In a subsequent break-away stroke, the partially cut sub-region (33) of the insulation of the cable (13) is broken away. Finally, in a stripping stroke the broken away sub-region (33) is pulled along the longitudinal axis (19) of the cable (13) from the electrical wire (39).

In order to avoid that in the stripping stroke, wherein the forces between the cable and the cutting blades (14a, 14b) suddenly drop, the hand levers (2, 3) perform an uncontrolled fast closing movement according to the invention at the transition from the break-away stroke to the stripping stroke a spring element and/or damping element (37) becomes effective which preferably comes into contact with a roller (36) of a lever (22).

16 Claims, 11 Drawing Sheets

(56) References Cited

U.S. PATENT DOCUMENTS

| | | | | |
|---|---|---|---|---|
| 7,513,177 | B2 * | 4/2009 | Hofmann | H02G 1/1204 |
| | | | | 81/9.41 |
| 7,513,249 | B2 * | 4/2009 | Minyard | B01D 53/002 |
| | | | | 126/299 D |
| 7,841,260 | B2 * | 11/2010 | Storm | H02G 1/1212 |
| | | | | 30/90.1 |
| 7,913,588 | B2 * | 3/2011 | Storm | H02G 1/1212 |
| | | | | 81/9.41 |

FOREIGN PATENT DOCUMENTS

| | | |
|---|---|---|
| DE | 4420006 | 12/1995 |
| DE | 195 12 132 | 5/1996 |
| DE | 202004018133 | 4/2006 |
| DE | 20 2015 100 50 | 6/2016 |
| EP | 0309871 | 4/1989 |
| EP | 2 056 416 | 6/2009 |
| JP | H01152911 | 6/1989 |
| JP | H06189426 | 7/1994 |
| JP | H08507434 | 8/1996 |
| JP | 2004274941 | 9/2004 |
| WO | WO 2005/036707 | 4/2005 |

* cited by examiner

STRIPPING PLIERS

CROSS REFERENCE TO RELATED APPLICATIONS

This application claims priority to co-pending European patent application No. EP 15 168 865.2 entitled "Abisolierzange", filed May 22, 2015.

FIELD OF THE INVENTION

Electrical cables comprise an electrical wire (which is in particular formed with a plurality of strands) which is covered with an insulating cover (in particular an insulation made of plastic) for providing an electrical insulation against the environment. For the electrical connection of the cable with a connector or any other electrical component, it is required to remove a (in particular sleeve-like) sub-region of the insulation in an end region of the cable. For this purpose, stripping pliers are used which
- in a cutting stroke of the stripping pliers at least partially cut into the coating in an end region,
- then in a break-away stroke "break-away" the previously at least partially cut sleeve-like sub-region of the coating and
- in a stripping stroke stripp the sleeve-like sub-region of the insulation off the electrical wire.

BACKGROUND OF THE INVENTION

The publication DE 37 33 358 C1, corresponding to U.S. Pat. No. 4,892,015 A, discloses insulating pliers, wherein two pliers jaws form an accommodation for a cable in the region of the bit of tongues. With a closure of the hand levers, at first the pliers jaws are closed. On both sides of the cable knife holders with cutting knives for removing the insulation are supporting on the inner side of the pliers jaws. In a cutting stroke with continuing closure of the pliers jaws the cutting knives cut into the coating of the cable. When the cutting jaws and therewith the cutting knives have been closed to an adjustable extent for which the insulation has been cut, a closing position of the cutting knives has been reached and the cutting stroke has ended. A break-away stroke follows to the cutting stroke. In the break-away stroke, the cutting knives are pulled in common and parallel to the longitudinal axis of the accommodation, so parallel to the longitudinal axis of the cable. The pulling movement leads to a break-away of the sleeve-like sub-region of the insulation and the stripping of the sub-region off the electrical wire. During the stripping stroke, the knife holders with the cutting knives held by the knife holders slide under guidance by the pliers jaws along the pliers jaws. This movement is caused by a pulling rod which is linked in one end region to the scissors-like pivotable knife holders. The other end region of the pulling rod is approximately in the middle linked to a control lever. One end region of the control lever is linked to a movable hand lever. The other end region of the control lever is guided by a roller by a control surface formed by the movable pliers jaw. During the cutting stroke, the roller contacts an end region of the control surface. Accordingly, the control lever is able to cause the cutting stroke with the closing movement of the pliers jaws and therewith of the cutting knives. For sufficiently great actuating forces at the end of the cutting stroke, the roller passes an elevation of the control surface which defines a force threshold. The roller then slides along the control surface which coincides with the actuation of the pulling rod and so the break-away stroke and the stripping stroke. At the end of the stripping stroke, the roller arrives in the region of an angular offset of the control surface so that in an opening stroke an open position of the movable pliers jaw is achieved. With the opening movement of the movable pliers jaw, the knife holders with the cutting knives move away from the cable. The length of the stripping stroke is defined by constructive measures, i.e. the distance of the elevation of the control surface from the angular offset. By dimensioning of the control surface, the length of the stripping stroke is defined such that the length is sufficient to completely pull the sleeve-like sub-region of the insulation off the electrical wire. The stripping pliers according to the publication DE 37 33 358 C1 additionally comprise a separating device for cutting through a cable for preparing the stripping process. Here, also the separating device is actuated by actuation of the hand levers. Furthermore, the stripping pliers comprise an adjusting device by which it is possible to adjust the extent of the closing movement of the cutting knives during the cutting stroke. Corresponding stripping pliers are distributed by the applicant under the label "Scora 2", cp. the website www.wezag.de.

The publication EP 2 056 416 A2, corresponding to U.S. Pat. No. 7,913,588 B2, discloses stripping pliers, wherein a fixed hand lever is rigidly connected to a pliers jaw located on the opposite side from a longitudinal axis of the stripping pliers. A movable hand lever is linked to this pliers jaw. In a pivot bearing, the other pliers jaw is linked to a base body formed by the pliers jaw and the fixed hand lever. The first mentioned pliers jaw is actuated via a pressure lever. In one end region, this pressure lever is linked to the movable hand lever. In the other end region, the pressure lever supports a roller. By the roller, the pressure lever is supported at the pliers jaw which is pivotable around the pivot axis. During the cutting stroke, the pivoting movement of the movable hand lever causes the application of a pivoting moment via the pressure lever upon the movable pliers jaw which leads to a closure of the bit of tongues and to the result that the cutting knives cut into the insulation of the cable. At the end of the cutting stroke, the pressure lever no longer displaces the movable pliers jaw. Instead, then the roller of the pressure lever rolls along the contact surface of the pliers jaw. By a second roller associated with a pulling rod the roller actuates the pulling rod. The displacement of the puling rod caused in this way and the displacement of the knife holders removably held at the pulling rod with cutting knives leads to a break-away stroke and a stripping stroke. During the break-away stroke and the stripping stroke, the knife holders and the cutting knives slide in a direction coaxial to the longitudinal axis of the cable along the pliers jaws under maintenance of the closing position of the cutting knives which has been reached at the end of the cutting stroke.

It is generally possible that with the stripping pliers the sleeve-like severed sub-region of the insulation is completely removed from the electrical wire. However, it might also be of interest to only move the sleeve-like sub-region during the stripping stroke along a small path on the electrical wire away from the remaining insulation. In the reached state, the separated sub-region of the insulation protects the electrical wire during storage and prior to the provision of the intended electrical connection. If the electrical wire is formed with a plurality of strands, the only partially stripped off sleeve-like sub-region avoids that the strands "fan out", which might make the later provision of the connection to a plug or another electrical component more difficult or might also have the consequence that single strands break off. It might also be desirable that (e.g. dependent on the diameter of the cable, the diameter and material of the electrical wire and/or the coating thickness and material of the insulation) the length of the partial stripping of the sleeve-like sub-region of the insulation by the stripping pliers (so the length of the stripping stroke) can be individually adjusted. According to the publication EP 2 056 416 A2, an adjustment of the length of the stripping stroke is provided by a stop element limiting the movement of the pulling rod. For the constructive design of the stop element, the publication EP 2 056 416 A2 discloses different embodiments: For a first embodiment, the stop element is formed by a pivotable L-shaped angled lever, wherein a front face of a leg of the lever forms the stop element for the pulling rod. In the respective pivoting position of the lever, the length of the leg which forms the stop element for the pulling rod defines the end of the stripping stroke. For another embodiment, the publication suggests that the stop element for the pulling rod for defining the end, of the stripping stroke is provided by a damping member located in the fixed hand lever. For still another embodiment, a kind of flattened cam disc is used for forming the stop element. Here, by a circumferential toothing the cam disc is latchable in different angular positions for adjusting stripping strokes to different lengths. Furthermore, the publication EP 2 056 416 A2 suggests to form the stop element for the pulling rod by a leaf spring which gives a haptic feedback to the user of the stripping pliers when arriving at the end of the stripping stroke which is defined by the leaf spring. For this embodiment, also an extension of the stripping stroke is possible when establishing the contact of the pulling rod with the leaf spring and when then increasing the hand forces applied to the stripping pliers under an increase of the elastical bias of the leaf spring.

The non-published utility model DE 20 2015 100 507.5 discloses stripping pliers comprising a securing device which secures the cutting blades in a partially or a completely closed position. This is in particular of advantage for the storage of the stripping pliers because it is e.g. avoided that a craftsman unintentionally grasps into the bit of tongues of the stripping pliers in the secured closed position of the cutting blades and harms himself by the cutting blades. On the other hand, for secured closed position of the cutting blades also the cutting blades are protected against damages.

Further prior art is known from the publications DE 42 05 194 C1, DE 195 12 132 C1 (corresponding to U.S. Pat. No. 5,724,870 A), WO 2005/036707 A1 (corresponding to U.S. Pat. No. 7,360,472 B2), DE 20 2004 018 133 U1 and DE 44 20 006 A1.

The present invention bases on the object to provide stripping pliers which are improved with respect to the handling and/or the operational safety.

SUMMARY OF THE INVENTION

The present invention bases upon an analysis of the forces and movements of stripping pliers. Here, it has been found that it might be required to apply comparatively great forces upon the hand lever of the stripping pliers during the cutting stroke in order to transfer the cutting blades into the closed position and in order to cause that the cutting blades cut into the insulation of the cable. Also for the "break-away" of the partially cut sleeve-like sub-region of the insulation during the break-away stroke, it is required to apply comparatively great forces. However, after the break-away of the sleeve-like sub-region of the insulation during the stripping stroke there are only comparatively small forces because for stripping off of the sleeve-like sub-region of the insulation it is only required to overcome the sliding frictional forces between the sleeve-like sub-region of the insulation and the electrical wire. This decrease of the required actuating force for the hand levers of the stripping pliers with the transition from the break-away stroke to the stripping stroke leads to the result that the cutting stroke as well as the break-away of the sleeve-like sub-region of the insulation have to be carried out in a sensitive and controlled fashion by the user of the stripping pliers. With the break-away of the sleeve-like sub-region of the coating and the sudden decrease of the sliding friction force which opposes the closure of the hand levers, a slow adaptation of the hand forces without a sudden reduction of the hand forces has the consequence that there is an uncontrolled sudden closing movement of the hand levers coinciding with a fast run through the stripping stroke. This is generally undesired because in this case the user of the stripping pliers has the impression to have a reduced control of the processing of the cable during the stripping stroke. In the worst case, the user grips around the hand levers of the stripping pliers in a way such that tips of the fingers of the hand are located between the hand levers. If there is a sudden fast closing movement of the hand levers during the stripping stroke, this might lead to a bruise and jamming of the tips of the fingers of the hand between the hand levers. These problems are (at least partially) removed within the frame of the invention as follows:

The inventive stripping pliers comprises two hand levers. The closing stroke of the hand levers is formed with three stroke parts:

In a cutting stroke, there is a closing movement of at least one cutting knife transverse to a longitudinal axis of an accommodation for a cable to be stripped. At the end of the cutting stroke, a closed position of the cutting blades is reached. In the closed position an insulation of a cable located in the accommodation is at least partially cut or severed. Accordingly, in the closed position a sleeve-like sub-region of the insulation is partially (preferably in at least one part of the circumference) separated.

Furthermore, the closing stroke of the hand levers comprises a break-away stroke. During the break-away stroke (wherein the cutting knives preferably remain in the closed position or leave the closed position only to a negligible extent), the at least one cutting blade is moved along the longitudinal axis of the accommodation for the cable to be stripped. This movement finally leads to the break-away of the sleeve-like sub-region of the insulation.

During a stripping stroke (after the partial separation in the cutting stroke and after the break-away in the break-away stroke), there is a movement of at least one cutting blade along the longitudinal axis of the accommodation for the cable to be stripped. Preferably, during the stripping stroke, the cutting blades remain in the closed position or change their position only to a negligible extent when compared to the closed position. During the stripping stroke, the sleeve-like sub-region of the insulation which has previously been broken away is moved with a sliding movement along the electrical wire. Here, it is possible that the sleeve-like sub-region is completely pulled off the electrical wire or only partially pulled off the electrical wire.

According to the invention, the stripping pliers comprise a spring element and/or damping element (which means a spring element, a damping element or an integral springdamping-element). The spring element and/or damping element comes into effect (exactly or approximately) with the transition from the break-away stroke to the stripping stroke. Accordingly, the spring element and/or damping element does not influence the force conditions at the stripping pliers during the cutting stroke and during the break-away stroke. Here, it is possible that during the cutting stroke and the break-away stroke the force conditions are defined by the kinematics and other spring elements and/or damping elements of the stripping pliers and that the spring element and/or damping element used according to the invention does not cause any additional force which has to be overcome for the provision of the cutting stroke and the break-away stroke. If instead with the transition from the break-away stroke to the stripping stroke the spring element and/or damping element becomes effective, the spring element and/or damping element causes a spring force and/or damping force during the stripping stroke which opposes the closure of the hand levers. By this additional spring force and/or damping force becoming effective during the stripping stroke, it is possible to at least partially compensate the above explained decrease of the force opposing the closure of the hand levers. Accordingly, also the above explained undesired effects (in particular a sudden closing movement of the hand levers after the end of the break-away stroke) are at least reduced.

Due to the fact that the spring element and/or damping element becomes only effective in a part of the closing stroke (namely during the stripping stroke), there might be a non-linear force component during the closing stroke which can be designed for being advantageous for the manipulation and operational safety of the stripping pliers.

Generally, within the frame of the invention, the spring element and/or damping element might be integrated in any way into the force flow of the stripping pliers as long as the spring element and/or damping element only becomes effective approximately with the transition from the break-away stroke to the stripping stroke. For one constructive embodiment of the inventive stripping pliers, the stripping pliers comprise a drive mechanism having a lever. The mechanical boundary conditions of the lever change with the transition from the cutting stroke to the stripping stroke. In order to mention only some non-limiting examples, this lever might be the control lever according to the publication DE 37 33 358 C1. For this control lever, the change of the mechanical boundary conditions at the transition from the cutting stroke to the break-away stroke are formed when the roller of the control lever passes the elevation of the control surface which defines the force threshold with the subsequent movement along the control surface. For embodiments according to EP 2 056 416 A2 the lever is formed by a pressure lever. For this embodiment, the change of the mechanical boundary conditions of the lever means that during the break-away stroke but not during the cutting stroke the roller of the pressure lever rolls along the actuating surface of the pliers jaw and that the pulling rod is moved by the roller of the pulling rod. According to the invention, during the cutting stroke and during the break-away stroke the lever and the spring element and/or damping element form a play. Due to this play, the spring element and/or the damping element do/does not influence the force conditions at the stripping pliers during the cutting stroke and the break-away stroke. With the transition from the break-away stroke to the stripping stroke the play has been removed so that during the subsequent stripping stroke the spring element and/or damping element is able to bias the lever for generating a spring force and/or damping force opposing the closure of the hand levers.

With the acting of the spring element and/or damping element upon a lever, it is possible to extend the design options for the characteristic of the spring force and/or damping force during the stripping stroke. It is e.g. possible that the lever changes its angle during the stripping stroke so that it is possible to generate different force changes of the spring element and/or damping element in dependence on the angle.

There are a lot of options for providing by constructive measures that the spring element and/or damping element only becomes effective with the transition from the break-away stroke to the stripping stroke. In order to mention only some non-limiting examples, it is possible that the spring element and/or damping element are/is attached under use of an elongated hole, wherein the elongated hole also defines the play and wherein with the transition from the break-away stroke to the stripping stroke the limitation of the elongated hole is reached. It is also possible that with the transition from the break-away stroke to the stripping stroke the spring element and/or damping element establishes a sliding contact with an adjacent component. For another proposal of the invention, the lever comprises a rotatable roller. With the transition from the break-away stroke to the stripping stroke the rotatable roller starts to interact with the spring element and/or damping element. Then during the stripping stroke the roller is able to roll along the spring element and/or damping element. In this way, it is possible to at least partially reduced undesired frictional effects.

For another embodiment of the inventive stripping pliers, the lever comprises a roller on each side of it. The two rollers have a common rotational axis. With the transition from the break-away stroke to the stripping stroke, the rollers start to interact with the spring element and/or damping element. For this design, the produced spring force and/or damping force is split to two contact surfaces which are each formed between one of the rollers and the spring element and/or damping element. Here, it is in some cases possible that despite of the use of two rollers there is only one single integral spring element and/or damping element contacting both of the two rollers. However, it is also possible that two spring element parts and/or damping element parts are used which each establish one single contact with the associated roller.

If the stripping pliers are used for stripping different cables (in particular cables having different diameters of the electrical wire and/or different sheet thicknesses of the insulation), in some cases the transition from the break-away stroke to the stripping stroke occurs in different closing positions of the stripping pliers. Accordingly for the stripping of a cable with a smaller diameter, in the beginning a larger part of the closing stroke of the hand levers has to be used for closing the cutting blades to an extent such that the cutting blades contact the outer surface of the cable before starting with the cutting stroke. In this case, the transition from the break-away stroke to the stripping stroke is located at the end of the closing stroke of the hand levers. Instead, for the stripping of a cable having a larger diameter, the transition from the break-away stroke to the stripping stroke takes place after having run through a smaller part of the closing stroke of the hand levers. It is possible that the stripping pliers are designed such that the spring element and/or damping element exactly becomes effective if for the largest cable to be stripped the transition from the break-away stroke to the stripping stroke has been reached. In this case, it is accepted that for smaller cables the spring element and/or damping element becomes effective too early, so during the break-away stroke (or even during the cutting stroke). However, it is also possible that the stripping pliers are designed such that for all of the diameters of the cable which have to be stripped by the stripping pliers, it is possible to achieve an optimized result. For this purpose, there might e.g. be a design such that for a middle diameter to be stripped, the spring element and/or damping element becomes effective at the transition from the break-away stroke to the stripping stroke.

It is possible to improve the manipulation of the inventive stripping pliers, if it is possible to adjust the play between the spring element and/or damping element and the lever so that by the adjustment of the play it is possible to consider the diameter of the cable to be stripped. By this adjustment of the play it is possible that the spring element and/or damping element exactly become/becomes effective with the transition from the break-away stroke to the stripping stroke. For the adjustment of the play between the spring element and/or damping element and the lever there are a lot of options. In order to mention only some non-limiting examples, it is possible that the adjustment of the play between the spring element and the damping element and the lever is provided by an adjustment of a position of the rotational axis of at least one roller of the lever. It is e.g. possible that the roller is supported for being rotated by a bolt with respect to the base body of the lever. Here, it is possible to insert the bolt into different bores of the lever or to form the bolt as an eccentric bolt, so that a rotation of the eccentric bolt leads to a displacement of the rotational axis of the roller. For another embodiment, the adjustment of the play is provided by an adjustment of the position of the position of the spring element and/or damping element. Here, it is possible that the play is adjusted in steps correlating with different diameters of the cable or that the play is adjusted in a stepless fashion.

For the design of the spring element and/or damping element there are lot of options. In order to mention only some non-limiting examples the spring element and/or damping element might e.g. be a wound spring, a leg spring and the like. For a particular proposal of the invention, the spring element and/or damping element is formed by an elastomeric body (e.g. a polyurethane-body).

Another embodiment of the invention relates to the constructive design and the integration of the spring element and/or damping element into the stripping pliers. For this proposal of the invention, the spring element and/or damping element is accommodated in one of the hand levers. There is not necessarily required an additional securing of the spring element and/or damping element in the hand lever by a press fit, an adhesive connection, a screwing and the like. Instead, the spring element and/or damping element might be secured in the hand lever due to the fact that after the insertion of the spring element and/or damping element into the hand lever a lid is mounted to the hand lever which blocks the removal of the spring element and/or damping element from the hand lever. The lid might be part of a storage device formed in the region of the hand lever. The storage device serves for storing at least one accessory of the stripping pliers. Concerning further details for a storage device of this type formed in the region of the hand lever reference is made to the non-published European patent application with the application number EP 14 177 831.6-1701.

According to another proposal of the invention, in the stripping pliers the spring element and/or damping element are/is used in a multifunctional way: In this case, the stripping pliers comprise also a separating device for completely cutting through a cable. The separating device is also actuated by the hand levers. The spring element and/or damping element also become/becomes effective in the last part of the stroke when the separating device completely cuts through the cable. This embodiment bases on the finding that when the separating device completely cuts through the cable at the beginning with the increasing entry of the separating blade into the cable the contact surface or contact length of the blade of the separating blade with the cable increases until the contact length corresponds to the diameter of the cable. This goes along with an increase of the force which has to be applied upon the hand levers. In the second half of the process of cutting through the cable then the contact length of the separating blade with the cable decreases. At the end instead of the electrical wire only the insulation (for which the cutting is easier) has to be cut. Accordingly, also here the required force decreases. By use of the spring element and/or damping element also at the end of the separating process, it is possible to counteract an increase of the cutting velocity and/or a decrease of the required actuating force.

For one design variant of the inventive stripping pliers, for the stripping of a cable having an outer diameter of 7.5 mm the spring element and/or damping element becomes effective after 30% to 50% of the closing stroke of the hand levers. It is also possible that for an outer diameter of the cable of 3.5 mm the spring element and/or damping element becomes effective after 40% to 60% of the closing stroke of the hand lever. For an alternative or cumulative embodiment, it is possible that for an outer diameter of 1.3 mm of the cable the spring element and/or damping element becomes effective after 50% to 65% of the closing stroke of the hand levers. The aforementioned outer diameters are nominal diameters, wherein it is also possible that the outer diameters differ from the specified outer diameters by +/−0.5 mm or +/−0.2 mm.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
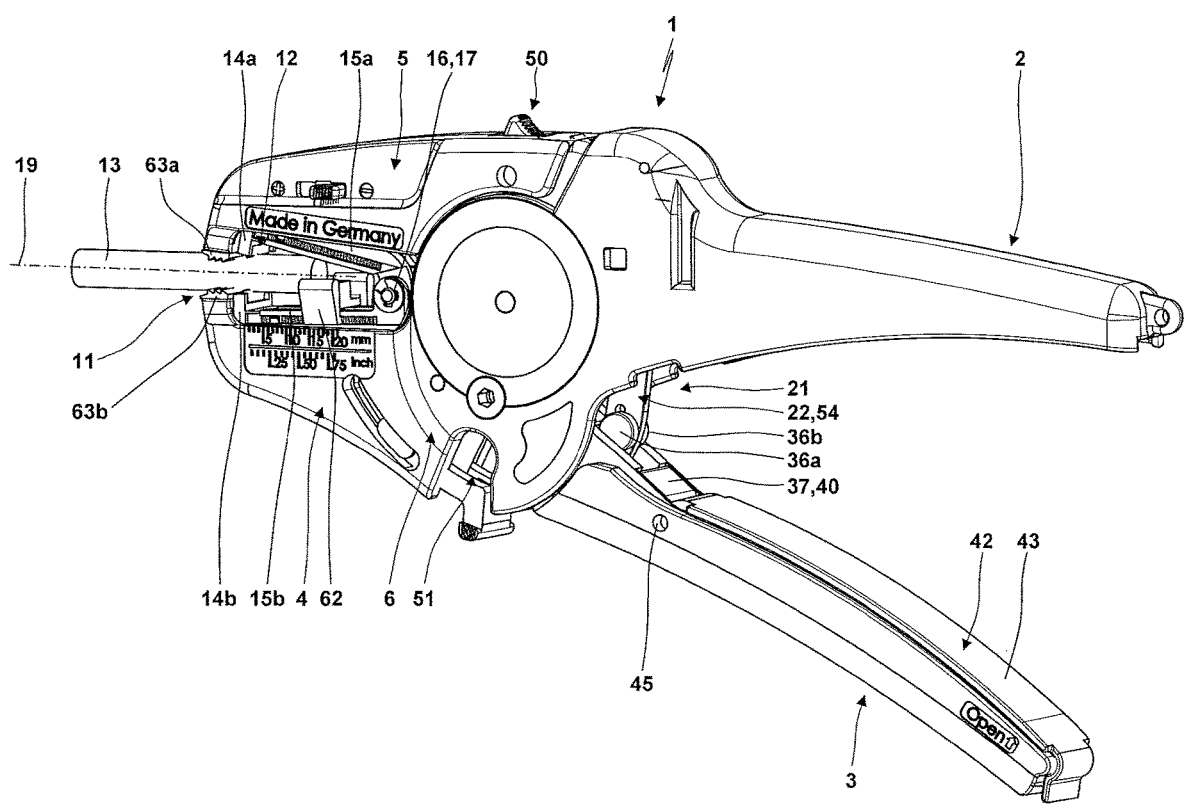
FIG. 1 is a three-dimensional view of stripping pliers.
Figure 2:
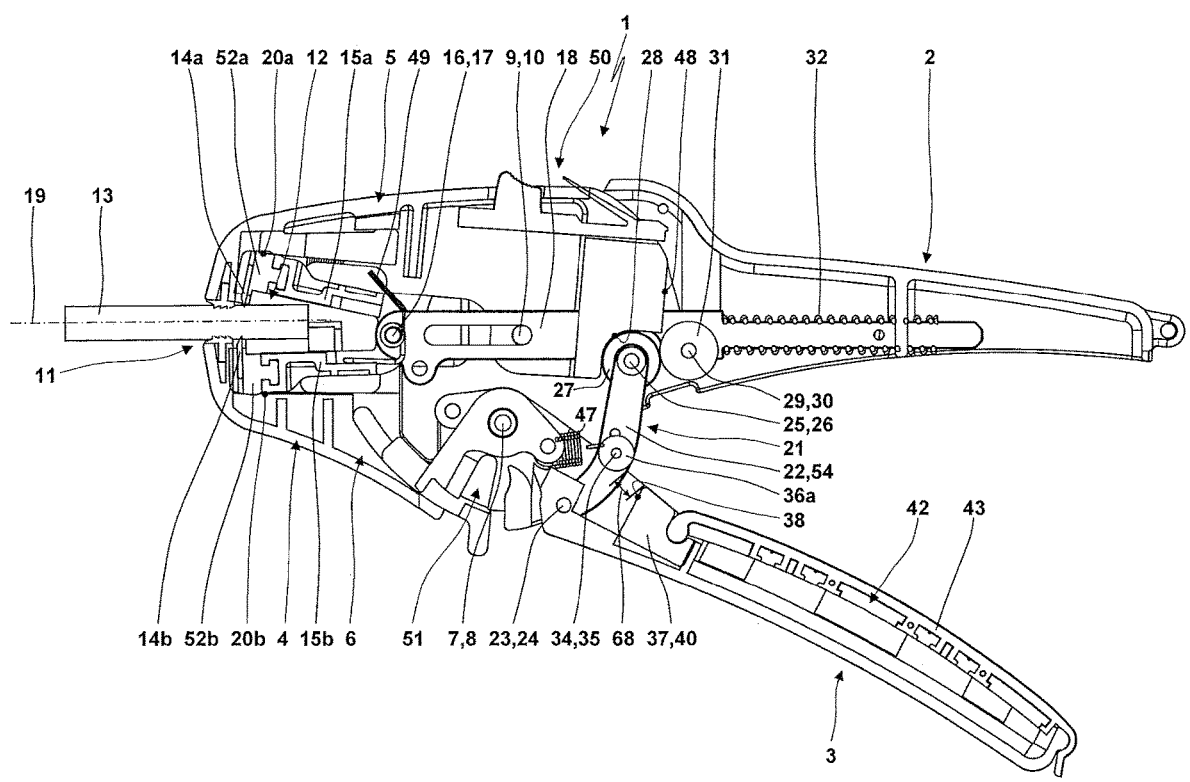
FIG. 2 shows the stripping pliers of FIG. 1 in a longitudinal section through the pliers head plane, the stripping pliers being shown during the cutting stroke.
Figure 3:
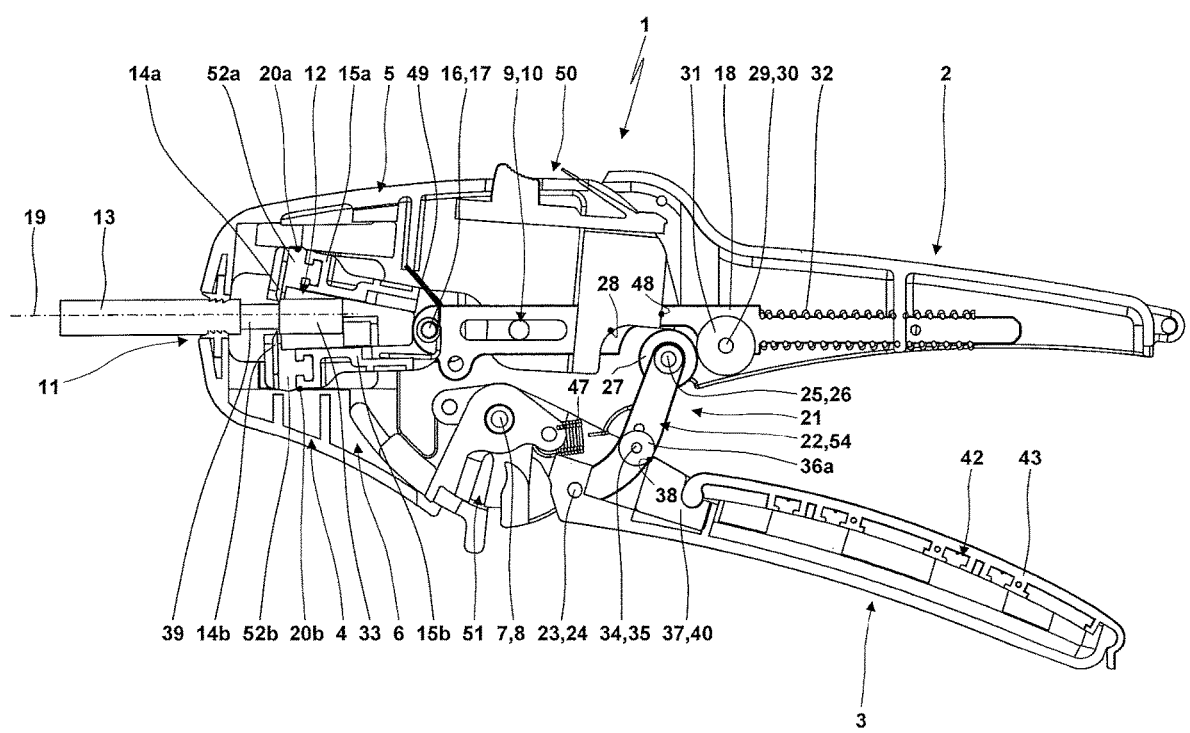
FIG. 3 shows the stripping pliers of FIGS. 1 and 2 in a longitudinal section through the pliers head plane, the stripping pliers being shown during the stripping stroke.

In FIGS. 1 to 3 one embodiment of stripping pliers 1 is shown. The stripping pliers 1 comprise a fixed hand lever 2 and a movable hand lever 3. For the provision of the closing stroke of the stripping pliers 1, the movable hand lever 3 is pivoted towards the fixed hand lever 2 by an application of actuation forces by the hand of the user.

The fixed hand lever 2 is denoted as "fixed hand lever" because the hand lever 2 is rigidly connected, here integrally formed with the pliers jaw 4 which is located on the opposite side. The fixed hand lever 2 and the pliers jaw 4 are accordingly part of a base body 6 at which other parts moved during the actuation of the stripping pliers 1 are supported for being moved. Here, the parts are primarily moved in the drawing plane of FIGS. 2 and 3 which corresponds to the pivoting plane of the hand levers 2, 3 and the longitudinal sectional plane through the pliers head.

The movable hand lever 3 is supported at the base body 6 in a bearing 7 (which is here formed with a bearing bolt 8) for being pivoted. The support of the movable pliers jaw 5 for being pivoted is provided by a bearing 9 which is here also formed by a bearing bolt 10.

A bit of tongues 11 of the stripping pliers 1 forms an accommodation 12 for a cable 13 to be stripped. In the bit of tongues 11 there are cutting blades 14a, 14b located on both sides of the accommodation 12. The cutting blades 14a, 14b are each held by blade holders 15a, 15b. In the hand regions facing away from the cutting blades 14a, 14b the blade holders 15a, 15b are linked to a pulling rod 18 for being pivoted like scissors by a bearing 16 which is here formed with a bearing bolt 17. The blade holders 15a, 15b here form a V which opens towards the bit of tongues 11 for forming the accommodation 12. During the cutting stroke with the closure of the hand levers 2, 3 the opening angle of the V decreases with a resulting coinciding movement of the cutting blades 14a, 14b towards each other and a cutting of the cutting blades 14a, 14b into the insulation of the cable 13. This movement of the cutting blades 14a, 14b correlates with the closing movement of the pliers jaws 4, 5. Instead, during a break-away stroke and a stripping stroke there is a movement of the cutting blades 14a, 14b, of the blade holders 15a, 15b as well as of the pulling rod 18 along a longitudinal axis 19 of the accommodation 12 and the cable 13 away from the bit of tongues 11. During this movement, the opening angle of the V of the blade holders 15a, 15b does not change or does not essentially change, wherein the corresponding also applies for the pliers jaws 4, 5. In the following, the cutting stroke is also denominated as "pivoting stroke". During the pivoting stroke, there is a pivoting movement of the pliers jaws 4, 5 and of the blade holders 15a, 15b with the cutting blades 14a, 14b with a change of the opening angle of the V. Instead, the break-away stroke and the stripping stroke are together also denominated as displacing stroke. During the displacing stroke the pulling rod 18 with the blade holders 15a, 15b and cutting blades 14a, 14b move along the longitudinal axis 19 without any significant pivoting of the same and without any change of the opening angle V.

The blade holders 15a, 15b and/or the cutting blades 14a, 14b are on their outer sides each supported by a sliding contact 20a, 20b at the associated pliers jaws 4, 5. During the pivoting stroke actuating forces are transferred from the pliers jaws 4, 5 to the blade holders 15a, 15b and/or the cutting blades 14a, 14b via the sliding contact 20a, 20b without a significant sliding movement occurring in the region of the sliding contacts 20. Instead, during the displacing stroke there is a relative movement of the cutting blades 14a, 14b and the blade holders 15a, 15b in the region of the sliding contact 20 relative to the pliers jaws 4, 5.

The stripping pliers 1 comprise a drive mechanism 21 for providing the pivoting stroke, on the one hand, and the displacing stroke following to the pivoting stroke, on the other hand, with one continuous pivoting movement of the hand levers 2, 3 towards each other. The drive mechanism 21 is interposed on the one hand between the hand levers 2, 3 and the pliers jaws 4, 5 in order to provide the pivoting stroke as well as on the other hand interposed between the hand levers 2, 3 and the pulling rod 18 for providing the displacing stroke.

The drive mechanism 21 comprises a lever 22 which is formed with a base body 54 and which is a pressure lever. For the shown embodiment, the base body 54 comprises a slight cranking or bending without this necessarily being the case. In one end region, the base body 54 is linked by a joint 23 (which is here formed with a bearing bolt 24) to the movable hand lever 3. In the other end region the lever 22 comprises a roller 27 which is supported by a bearing 25 (here with a bearing bolt 26) at the base body 54 for being rotated. The roller 27 establishes a rolling contact with an actuation contour 28 of the movable pliers jaw 5. During the cutting stroke, the contact of the roller 27 with the actuation contour 28 does not change so that there is no rolling movement of the roller 27 relative to the actuation contour 28. The actuation force applied by the user upon the hand lever 2, 3 leads to a force in the lever 22. The force in the lever 22 leads to a first component which acts upon the movable pliers jaw 5 in the region of the actuation contour 28 and which has an orientation in circumferential direction around the bearing 9 which causes a closing force acting upon the movable pliers jaw 5. Any second component of the force in the lever 27 having an orientation radial to the bearing 9 does not exist during the cutting stroke or is supported by different measures described in the following in a way such that this second component of the force does not lead to a movement of the roller 27 along the actuation contour 28.

A roller 31 is supported for being rotated by the pulling rod 18 in a bearing 30 here formed with a bearing bolt 29. The pulling rod 18 is supported for being displaced relative to the base body 6 for a movement having a direction coaxial or parallel to the longitudinal axis 19. The pulling rod 18 is here biased by a preloaded spring 32 along a degree of freedom for a displacement and towards the bit of tongues 11. By the spring 32, the roller 31 is biased against the roller 27 of the lever 22. Due to the preload of the spring 32 and due to the preload force applied upon the roller 27 of the lever 22, during the cutting stroke a rolling movement of the roller 27 relative to the actuation contour 28 is avoided. However, at the end of the cutting stroke the force in the lever 27 is able to push the pulling rod 18 with the roller 31 away from the bit of tongues 11 under an increasing bias of the spring 32. This is the case because the force provided by the lever 27 at the contact between the rollers 27, 31 is greater than the preload force of the spring 32. The preload force of the spring 32 might, on the one hand, be exceeded because the force in the lever 22 is successively increased with the closing movement of the hand levers 2, 3. However, it is also possible that with the closing movement of the hand levers 2, 3 and with the coinciding pivoting movement of the movable pliers jaw 5 there is a pivoting of the actuation contour 28 so that by the roller 27 the force in the lever 27 is increasingly redirected towards the displacing degree of freedom of the pulling rod 18. With the initiation of the movement of the pulling rod 18, the transition from the pivoting stroke to the displacing stroke is reached, namely the transition from the cutting stroke to the break-away stroke.

During the cutting stroke, the cutting blades 14a, 14b have each cut into a part of the circumference of the insulation on opposing sides of the cable 13. During the first part of the displacing stroke, namely during the break-away stroke, the sleeve-like sub-region 33 of the insulation (which has partially been cut off during the cutting stroke) is broken away. If the sub-region 33 has completely been broken away, there is the transition from the break-away stroke to the stripping stroke. Preferably, during the break-away stroke there is a movement of the cutting blades 14a, 14b or the pulling rod 18 along the longitudinal axis 19 of 6.0 mm to 8.0 mm, in particular of 6.5 mm to 7.5 mm.

The lever 22 comprises another roller 36 which is supported for being rotated at the base body 54 by a bearing 34, here formed with a bearing bolt 35. During the cutting stroke, a play 68 is formed between the lever 22 and a spring element and/or damping element 37. With the transition from the break-away stroke to the stripping stroke, the outer circumference of the roller 36 comes into contact with the spring element and/or damping element 37 which is held at the movable hand lever 3. Here, the bias of the spring element and/or damping element 37 by the roller 36 is such that a further pivoting movement of the lever 22 around the bearing 23 with respect to the hand lever 3 (which is required for achieving another movement of the pulling rod 18 away from the bit of tongues 11) coincides with a higher bias of the spring element and/or damping element 37. With this pivoting movement, the roller 36 rolls along a contact surface 38 of the spring element and/or damping element 37. The spring element and/or damping element 37 causes a moment at the lever 22 which has an orientation towards the bit of tongues 11 and opposite to the movement of the pulling rod 18 during the stripping stroke. Accordingly, the spring element and/or damping element 37 causes a force. This force opposes the effect of the fast closure of the hand levers 2, 3 during the stripping stroke due to reduced forces between the cutting blades 14a, 14b and the sub-region 33 which performs a sliding movement with respect to the electrical wire 39.

For the shown embodiment, the spring element and/or damping element 37 are/is formed by an elastomeric body 40, which might e.g. have in a first rough approximation a block-like geometry.

Figure 4:
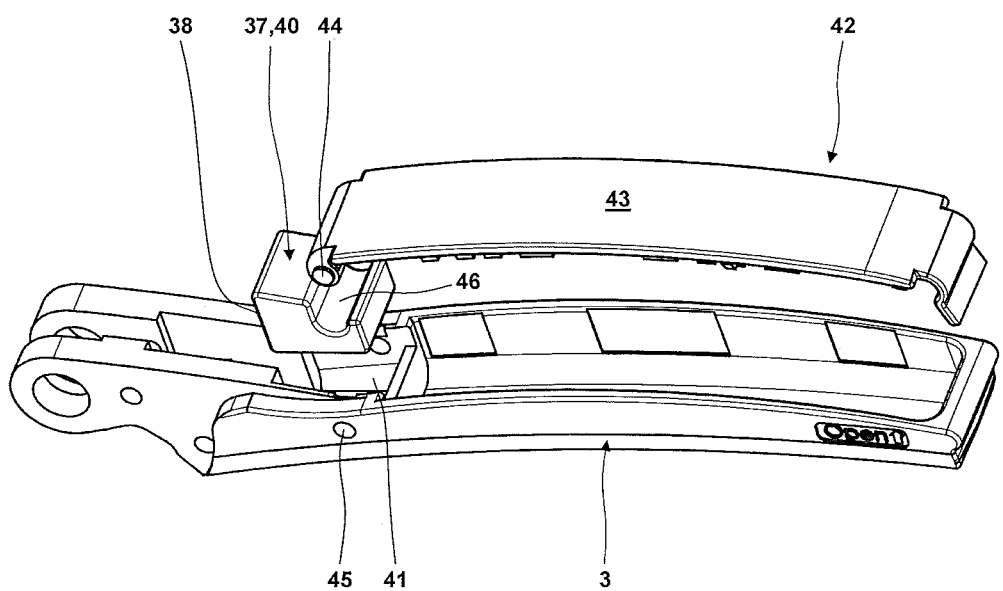
FIG. 4 shows a hand lever with spring element and/or damping element and a lid for a storage device in a three-dimensional explosional view.

According to FIG. 4, the hand lever 3 might comprise a recess or accommodation 41 on the side facing towards the hand lever 2. It is possible to insert the spring element and/or damping element 37 into the recess or accommodation 41 from the side facing towards the hand lever 2. Preferably, the spring element and/or damping element 37 is held in the accommodation 41 in a way such that the spring element and/or damping element 37 are/is fixed in the hand lever 3 with a remaining a removal degree of freedom towards the other hand lever 2 (so transverse to the longitudinal extension of the hand lever 3). In the direction of the contact force applied by the roller 36 upon the spring element and/or damping element 37, the spring element and/or damping element 37 are/is supported without any play at the hand lever. In the assembled state the spring element and/or damping element 37 might be secured in the aforementioned removal direction by latching or any securing device.

For the shown embodiment, a storage device 42 is formed in the region of the hand lever 3 as disclosed in the European patent application with the official application number EP 14 177 831.6-1701. The storage device 42 here comprises a lid which closes the storage device 42 on the side facing towards the hand lever 2. The lid 43 is linked for being pivoted to a base body of the hand lever 3 for a pivoting movement between an open position and a closed position (and vice versa). For this purpose, the lid 43 comprises a bearing stud which is insertable into a bearing lug 45 of the base body of the hand lever 22 (e.g. under elastical deformation of the base body). For the shown embodiment, the lid 43 is used in a multifunctional way by using the lid 43 for securing the spring element and/or damping element 37 in the accommodation 41 against a removal additional to the use of the lid 43 for closing the storage device 42. For this purpose, the spring element and/or damping element 37 contact/contacts the lid 43 in removal direction in the region of the bearing stud 44 so that the removal direction is blocked. Preferably, on the side facing towards the bearing stud 44 the spring element and/or damping element 37 comprise/comprises a semi-cylindrical recess 46 having an orientation parallel to the bearing stud 44. The end region of the lid 43 with the bearing stud 44 contacts the recess 46 for avoiding the removal of the spring element and/or damping element. Due to the contour of the recess 46, a pivoting movement of the lid 43 between the open position and the closed position of the lid 43 is possible. It is also possible that in the assembled state of the lid 43 the spring element and/or damping element 37 are/is preloaded in the contact region of the recess 46 in the base body of the hand lever 3.

Without this necessarily being the case, it is possible that the lever 22 comprises rollers 36*a*, 36*b* supported for being rotated on both sides which establish the contact with the spring element and/or damping element 37 during the stripping stroke so that the surface pressure in the contact with the spring element and/or damping element 37 is reduced.

In the embodiment according to FIGS. 1 to 4, the following optional additional components and additional functions are shown:

By means, of an additional spring 47 it is possible to further influence the force conditions at the lever 22. Preferably, during the cutting stroke the spring 47 biases the lever 22 against the actuation contour 28 so that by means of the spring 47 it is also possible to design the transition point from the cutting stroke to the break-away stroke.

It is possible that the actuation contour 28 is formed with an undercut 48. If the roller 27 approaches the region of the undercut 48, the pliers jaw 5 is able to perform an opening stroke caused by an opening spring 49 in spite of a further closure of the hand levers 2, 3.

A securing device according to DE 20 2015 100 507.5 is denoted with the reference numeral 50.

Furthermore, the stripping pliers 1 are here formed with a separating device 51 which is automatically closed or covered in outer direction with the closure of the hand levers according to the European patent application with the official application number EP 1 153 683.6.

The cutting blades 14*a*, 14*b* are exchangeably or removably held by the blade holders 15*a*, 15*b* for building cutting elements 52*a*, 52*b* according to the European patent application with the official application number EP 14 177 826.6.

It is possible to use an adjusting device 53 if it is intended that in the factory or by a user of the stripping pliers 1 it is possible to change the transition point from the break-away stroke to the stripping stroke (so to change the position during the closing stroke for which the roller 36 after closure of the play 68 for the first time contacts the spring element and/or damping element 37). For the embodiment shown in FIG. 5, by means of the adjusting device 53 it is possible to change the position of the roller 36 relative to the base body 54 of the lever 22. This results in a change of the distance of the roller 36 from the spring element and/or damping element 37 in the starting position of the hand levers 2, 3. For the embodiment shown in FIG. 5, the base body 54 of the lever 22 comprises a bearing bore 55 as well as a fixing bore 56. In this case the roller 36 comprises a bearing bore 57 and a plurality of fixing bores 58*a*, 58*b* which are dispersed in circumferential direction around the bearing bore 57 with a distance from the bearing bore 57 corresponding to the distance of the fixing bore 56 from the bearing bore 55 of the base body 54. Here, the roller 36 is assembled to the base body 54 of the lever 22 by a bearing bolt 59 which extends with a press fit through the bearing bores 55, 57 and by a fixing bolt 60 which extends also with a transition fit or press fit through the fixing bore 56 and one of the fixing bores 58*a*, 58*b*. The bearing bore 57 is located eccentrically at the roller 36. Dependent on the choice of the fixing bore 58*a*, 58*b* and due to the eccentrical location of the bearing bore 57, there is a change of the distance of the contact surface which faces towards the spring element and/or damping element 37 and which is formed by the outer surface of the roller 36. In this way, it is possible to adjust the position in the closing stroke for which for the first time the roller 36 comes into contact with the spring element and/or damping element 37. Due to the mounting of the roller 36 both by the bearing bolt 59 as well as by the fixing bolt 60, for this embodiment it is not possible to rotate the roller 36.

However, it is also possible that the roller 36 is supported at the base body 54 for being rotated by an eccentric pin. One axial section of the eccentric pin is housed in the bearing bore 57, whereas another eccentric axial section of the pin is rotatably housed in the bearing bore 57. By a rotation of the eccentric pin, it is possible to adjust the transition point from the break-away stroke to the stripping stroke. In this case, no fixing bolt 60 is used.

Figure 5:
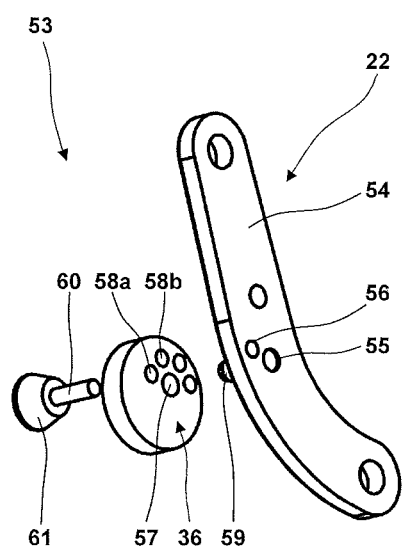
FIG. 5 in a three-dimensional explosional view shows a lever with a base body, a bearing bolt, a roller and a fixing bolt forming an adjusting device for adjusting a play which is present during the cutting stroke.

Preferably, for the embodiment shown in FIG. 5 the fixing bolt 60 comprises a manipulation element 61, in particular a conical thickening by which it is possible to move the fixing bolt 60 from one fixing bore 58*a* to another fixing bore 58*b*.

Figure 6:
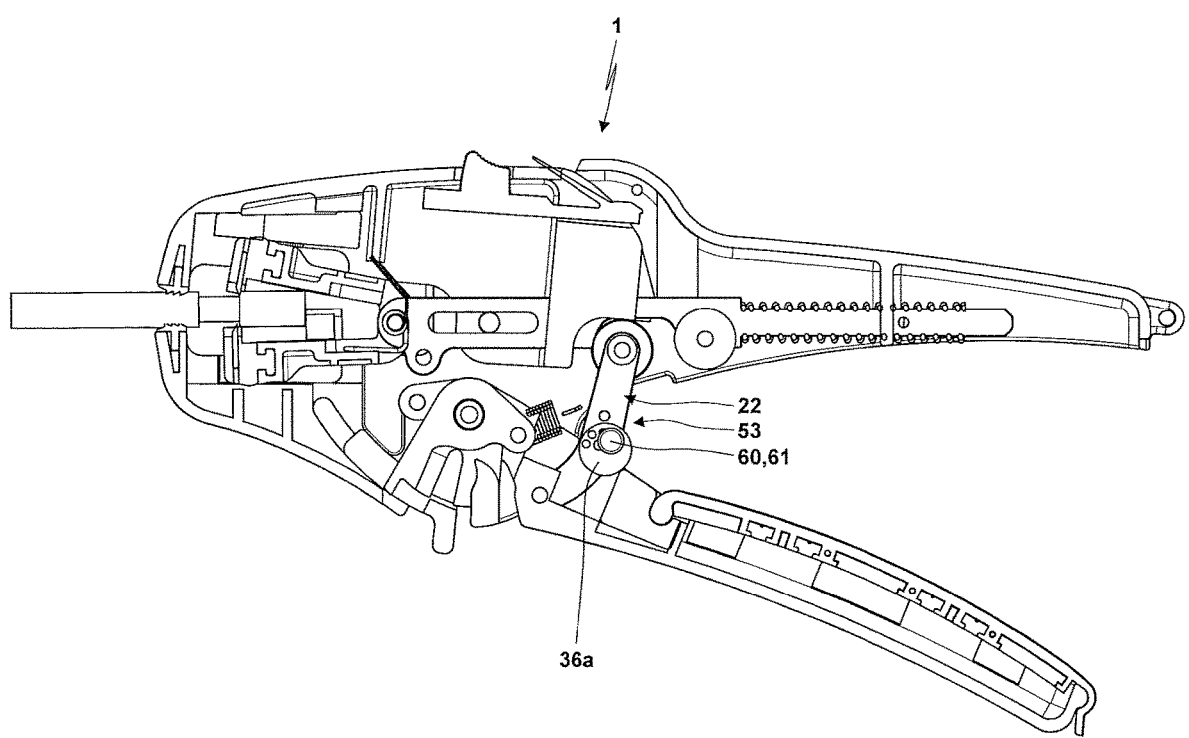
FIGS. 6 and 7 show stripping pliers in a longitudinal section through the pliers head plane, wherein the adjusting device according to FIG. 5 is shown in different operational positions.
Figure 7:
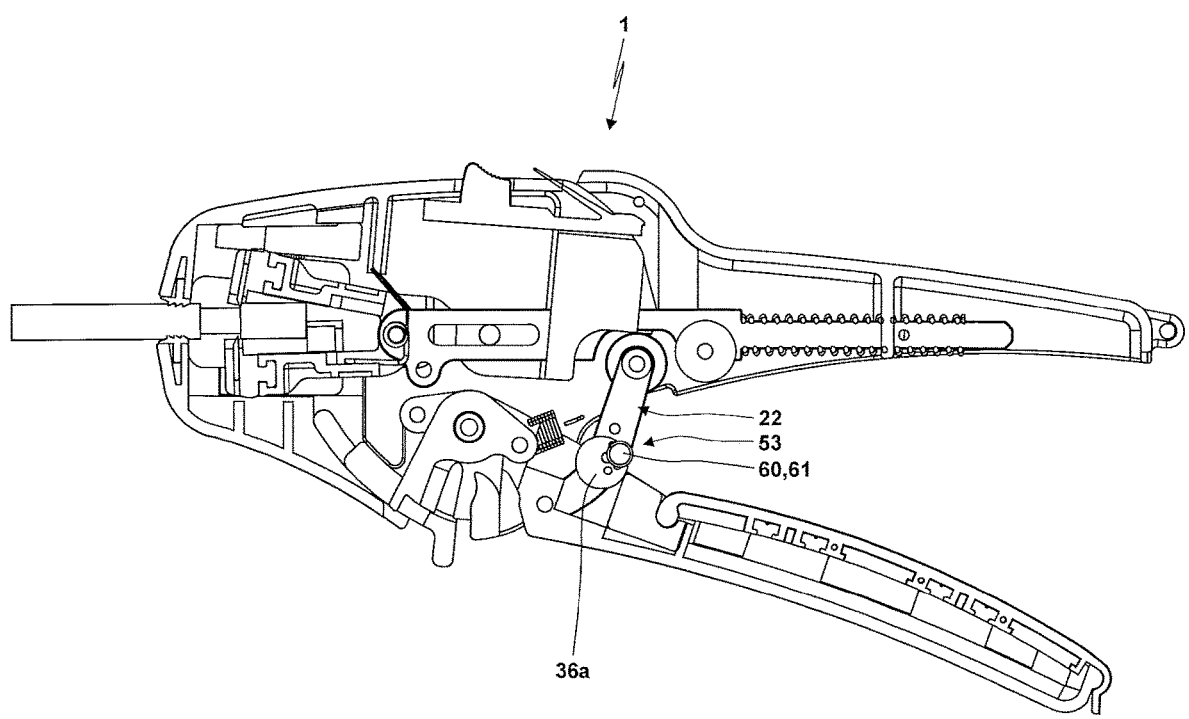

FIGS. 6 and 7 show the adjusting device 53 in different operational positions, wherein the fixing bolt 60 is located in different fixing bores 58*a*, 58*b*, . . . . For the different operational positions of the adjusting device 53 the roller 36 protrudes to differing extents from the base body 54 of the lever 22 towards the spring element and/or damping element 37.

The stripping pliers 1 are operated as follows:

At first the cable 13 is inserted into the accommodation 12 of the stripping pliers 1. Here, by an adjustable stop element 62 it is defined how far the cable 13 can be inserted into the accommodation 12. The stop element 62 here defines the length of the sub-region 33 to be stripped corresponding to the distance of the stop element 62 from the cutting knives 14*a*, 14*b*.

Subsequently, at first the hand levers 2, 3 are actuated in an empty stroke until the cable 13 is clamped between the clamping jaws 63*a*, 63*b* and the cutting blades 14*a*, 14*b* come into contact with the outer surface of the insulation of the cable 13.

The further closure of the hand levers in a cutting stroke leads to a pivoting movement of the pliers jaws 4, 5 towards each other. In the pivoting stroke, the actuation of the hand levers 2, 3 leads to the result that via the pliers jaws 4, 5 the cutting plates 14*a*, 14*b* are pressed towards the cable 13 which-coincides with the cutting of the insulation. During the cutting stroke, the boundary conditions of the lever 22 do not change because the lever is borne in the bearing 23 and the roller 27 contacts the actuation contour 28 without any rolling movement.

With the transition from the cutting stroke to the break-away stroke the boundary conditions of the lever 22 change because the roller 27 rolls along the actuation contour which coincides with an increased pivoting of the lever 22 and the movement of the pulling rod 18 with the roller 31. During the break-away stroke, there is a movement of the pulling rod 18 without any interaction of the lever 22 with the spring element and/or damping element 37. At the end of the break-away stroke and at the beginning of the stripping stroke, the roller 36 establishes a contact with the spring element and/or damping element 37 so that additionally a spring force and/or damping force of the spring element and/or damping element 37 opposes an increase of the stripping displacement.

Figure 8:
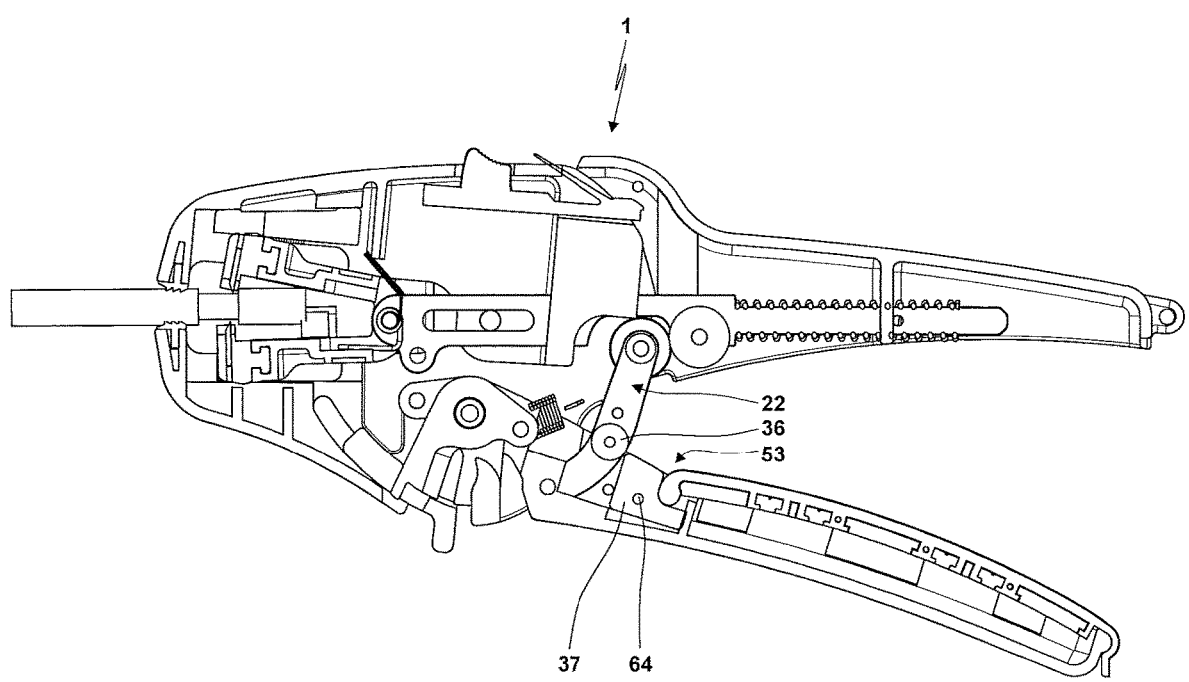
FIGS. 8 and 9 show stripping pliers in a longitudinal section through the pliers head plane, wherein an adjusting device is formed with a movable spring element and/or damping element and the adjusting device is shown in different operational positions.
Figure 9:
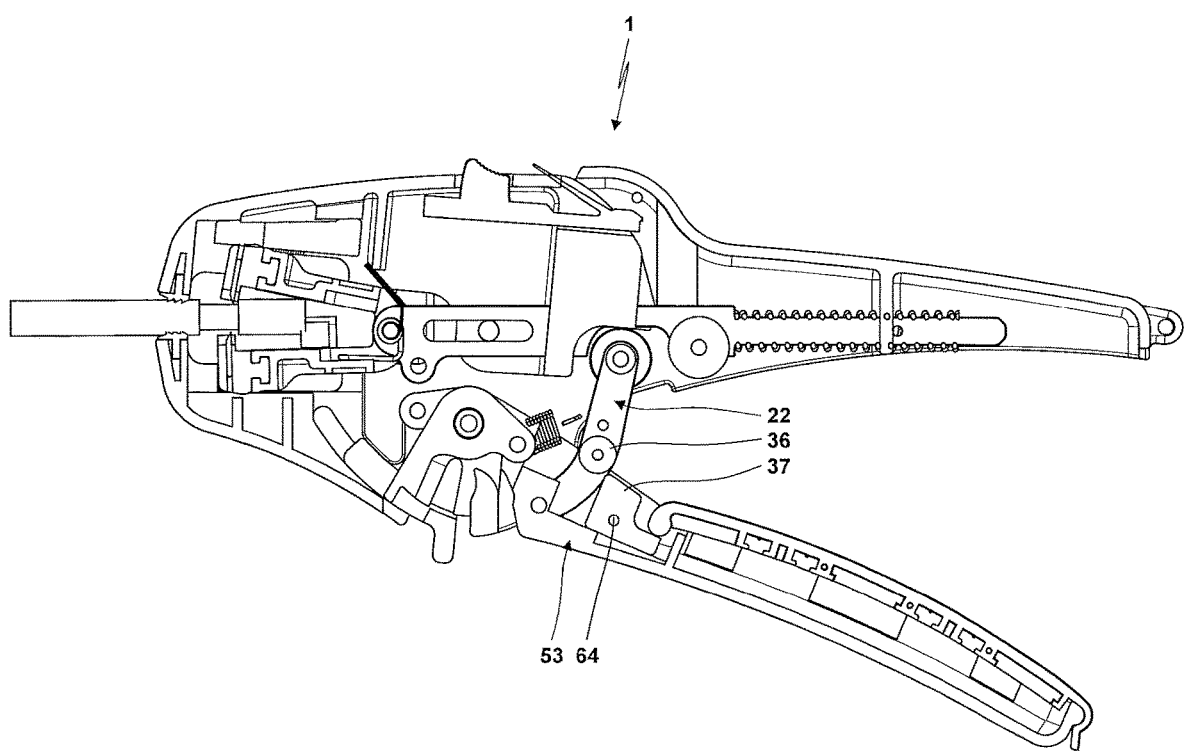
Figure 10:
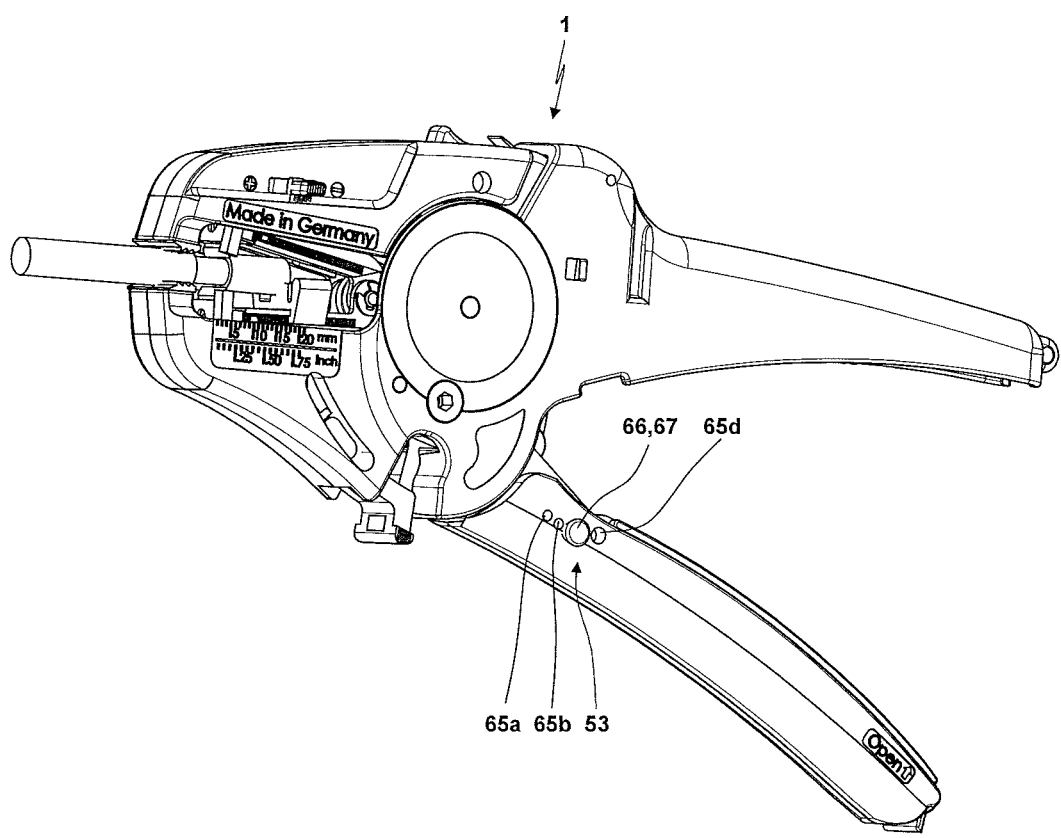
FIG. 10 shows the stripping pliers according to FIGS. 8 and 9 in a three-dimensional view.

In FIGS. 8 to 10 an alternative embodiment of the adjusting device 35 is shown. Here, the roller 36 does not rotate around a non-adjustable rotational axis at the base body 54 of the lever 22. In this case, by means of the adjusting device 53 it is possible to change the relative position of the spring element and/or damping element 37 at the hand lever 3. Here, the accommodation 41 for the spring element and/or damping element 73 is designed such that the spring element and/or damping element 37 has a limited degree of freedom in the accommodation 41 along the longitudinal axis of the hand lever 3. The spring element and/or damping element 37 comprises a transverse bore 64, whereas the hand lever 3 comprises a plurality of fixing bores 65*a*, 65*b*, . . . positioned along the longitudinal extension of the hand lever 3. In the different positions of the spring element and/or damping element 37 it is possible to secure the spring element and/or damping element 37 by means of a fixing bolt 66 having a manipulation element 67 by inserting the fixing bolt 66 through one of the fixing bores 65*a*, 65*b* and the transverse bore 64.

Figure 11:
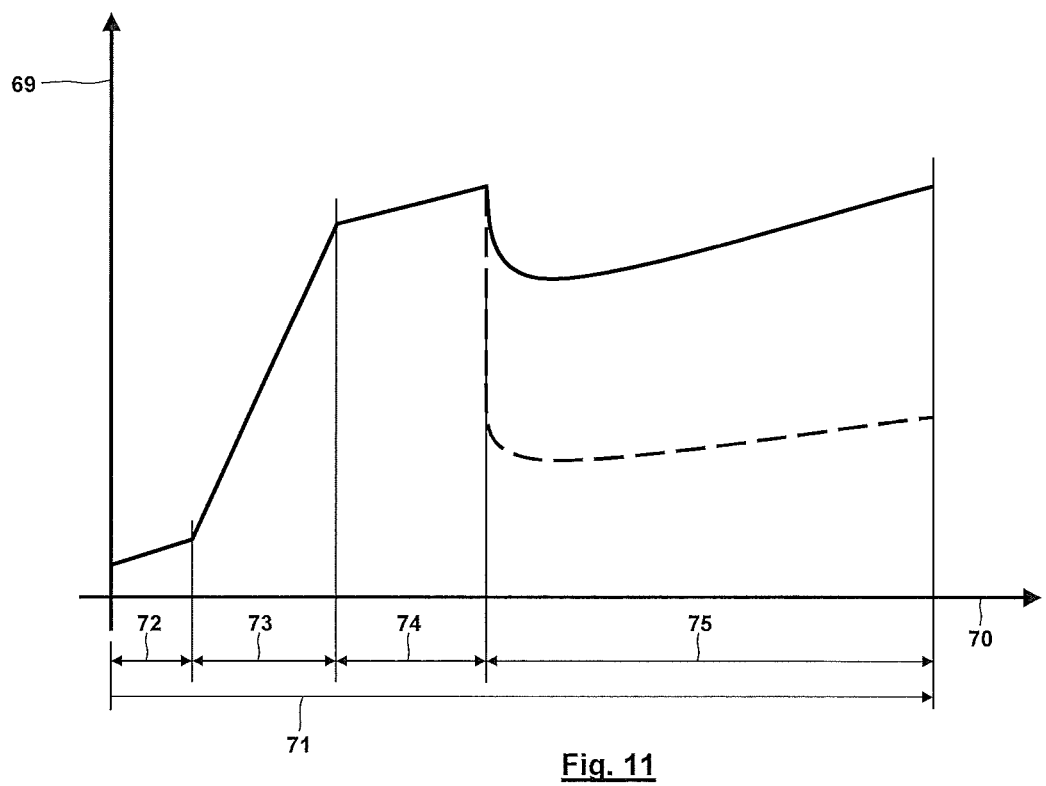
FIG. 11 shows an exemplary progression of the actuation force at the hand levers of stripping pliers during the closing stroke of the hand levers.

FIG. 11 shows the required actuation force 69 that has to be applied by the user upon the hand levers 2, 3 over the closing pivoting angle 70 of the hand lever 3 with respect to the hand lever 2 during the closing stroke 71 between the open position and the closed position of the hand levers 2, 3. During an empty stroke 72 without a counteracting force produced at the cutting blades 14*a*, 14*b*, the pliers jaws 4, 5 are closed until the end of the empty stroke 72 where the cutting blades 14*a*, 14*b* come into contact with the outer surface of the cable 13. During the empty stroke 72, the actuation of the hand levers 2, 3 with a small actuating force 69 is sufficient, wherein during the empty stroke 72 the actuating force might e.g. increase linearly due to the bias of the spring 49. In the subsequent cutting stroke 73, the cutting blades 14*a*, 14*b* cut into the insulation of the cable 13. Here, the required actuating force 69 increases with continued closure of the hand levers 2, 3. This is due to the fact that, on the one hand, the spring 49 is further biased and, on the other hand, the cutting force at the cutting blades 14*a*, 14*b* has to be applied. Here, it is in some cases possible that the cutting force increases with increasing entry of the cutting blades 14*a*, 14*b* into the insulation of the cable 13. Then, the break-away stroke 74 follows, wherein the actuating force 69 further increases because the required movement of the pulling rod 18 counteracts the bias of the pulling rod 18 by the spring 32. At the end of the break-away stroke 74, the sub-region 33 has completely been broken away from the residual part of the insulation of the cable 13. Shown with dashed line in FIG. 11 is the decrease and further course of the actuating force 69 as resulting without the use of the inventive spring element and/or damping element 37. Due to the fact that with the break-away a force required for the elastic and plastic deformation of the insulation in the connecting region between the sub-region 33 and the remaining part of the insulation is no longer present, for the non-inventive embodiment the actuation force 69 suddenly reduces. Then, in the stripping stroke 75 it is only necessary to overcome the sliding friction between the sub-region 33 and the electrical wire of the cable 13 and any additional bias by the spring 32. Instead, according to the invention the spring element and/or damping element 37 is additionally biased over the stripping stroke 75 so that the reduction of the actuating force is at least reduced which is shown by the curve of the actuating force shown with solid line during the stripping stroke 75 in FIG. 11.

The curve of the actuating force 69 shown in FIG. 11 has only been chosen as an example. Accordingly, with the inventive stripping pliers 1 it is possible to generate also different slopes, curve progressions (straight or curved) and/or thresholds for the transition between single stroke parts.

It is possible that the spring element and/or damping element 37 interacts with the lever 22 still during the break-away stroke 74 and slightly before (in particular with a pivoting angle of the hand levers 2, 3 of max. 8°, 5°, 3° or 2° before) the beginning of the stripping stroke 75. However, it is also possible that the spring element and/or damping element 37 starts to interact with the lever 22 slightly after (in particular with a pivoting angle of the hand levers 2, 3 of max. 8°, 5°, 3° or 2° after) the start of the stripping stroke 74.

For another design of the inventive stripping pliers 1, the spring element and/or damping element 37 does not exactly come into effect at the transition from the break-away stroke 74 to the stripping stroke 75 (e.g. for an axial movement of the cutting blades 14*a*, 14*b* during the break-away stroke of 6.5 mm to 7.5 mm) but instead already for an axial path of the cutting blades 14*a*, 14*b* with a maximum of 3.0 mm, 2.0 mm or 1.0 mm before or after the transition from the break-away stroke 74 to the stripping stroke 75.

For another design within the frame of the invention, the spring element and/or damping element 37 becomes effective, if the hand levers have run through the closing stroke 71 by 30% to 60% (in particular 40% to 50%).

For another embodiment, the spring element and/or damping element 37 becomes effective during the break-away stroke 74 or during the first 10% of the stripping stroke.

Here, it is possible that the aforementioned specifications for which closing position of the hand levers 2, 3 and/or for which movement of the cutting blades 14*a*, 14*b* the spring element and/or the damping element 37 becomes effective apply a) for one single admissible cable diameter,
   b) for all cable diameters of a plurality of specific cable diameters which according to the specifications of the manufacturer can be stripped by the stripping pliers 1 or
   c) the largest of a plurality of specific cable diameters.

It is also possible that in the case that a plurality of cable diameters is specified for the stripping pliers 1, the relative position of the transition from the break-away stroke 74 to the stripping stroke 75 is for at least one specific cable diameter in front of the position of the hand levers 2, 3 for which the spring element and/or damping element 37 for the specific cable diameter for the first time becomes effective. Instead, the relative position of the transition from the break-away stroke 74 to the stripping stroke 75 for at least one different specific cable diameter is positioned behind the position of the hand levers 2, 3 for which the spring element and/or damping element 37 for this further specific cable diameter for the first time becomes effective. It is also possible that for a plurality of specified cable diameters the relative positions of the transition from the break-away stroke 74 to the stripping stroke 75 to the positions of the hand levers 2, 3 for which the spring element and/or damping element 37 for the specified cable diameters for the first time become effective are optimized.

For another design of the inventive crimping pliers, it is possible to strip cables (e.g. the largest specified cable) having an outer diameter of 7.5 mm. In this case, the spring element and/or damping element becomes e.g. effective after 30% to 50% of the closing movement of the hand levers 2, 3. Instead, when stripping a cable having an outer diameter of 3.5 mm, the spring element and/or damping element becomes effective after 40% to 60% of the closing movement 71 of the hand levers 2, 3. For the stripping of a cable having an outer diameter of 1.3 mm, the spring element and/or damping element becomes effective after 50% to 60% of the closing stroke of the hand levers 2, 3.

Without a limitation to this embodiment being intended, the closing stroke 71 of the hand levers might e.g. be provided over an angle of 30° to 40°, preferably 34° to 38°.

For the embodiment of FIGS. 5 to 7, the roller 36 might also comprise a non-circular, cam-like outer surface.

For the shown embodiment, the roller 36 is linked or fixed to the base body 54 of the lever 22 between the bearings 23, 25 (e.g. approximately in the middle).

Generally, the invention might be used for stripping pliers 1 having a general design for the provision of the stripping of the cable as known from the prior art as long as the stripping pliers comprise a cutting stroke, a break-away stroke and a stripping stroke. For this purpose, it is e.g. possible to use a design of the stripping pliers, in particular with respect to the actuating kinematic and/or with respect to additional functions, according to the prior art as cited in the beginning. In order to mention only some non-limiting examples, it is possible that

- the actuating kinematics of the stripping pliers have a design according to DE 37 33 358 C1,
- the stripping pliers are formed with an adjustable stop element for limiting the stripping stroke according to EP 2 056 416 A2,
- the stripping pliers have a design with hand levers with exchangeable handle shells for an adaptation to different sizes of the hands of the user according to EP 2 056 416 A2,
- the cutting blades have a design with a blade having an orientation transverse to the longitudinal extension of the accommodation for the cable or with blades comprising a plurality of lamella for improving the adaptability of the cutting contour to different cable geometries,
- in the region of the bit of tongues an adjustable stop element is provided for the provision of an adjustable length of the stripped sub-region,
- the stripping pliers comprise a separating device which might also be equipped with a locking lever according to EP 2 056 416 A2,
- the stripping pliers comprise exchangeable blade cassettes in which the cutting blades are supported or borne (cp. EP 2 081 266 A1),
- the stripping pliers are equipped with ejectors corresponding to EP 2 056 416 A2,
- the stripping pliers comprise a storage device for storing an accessory according to the European patent application with the official application number EP 14 177 831.6-1701,
- the stripping pliers comprise a securing device by which the cutting blades are securable in a partially closed position or a completely closed position (cp. DE 20 2015 100 507.5).

Many variations and modifications may be made to the preferred embodiments of the invention without departing substantially from the spirit and principles of the invention. All such modifications and variations are intended to be included herein within the scope of the present invention, as defined by the following claims.

I claim:

1. Stripping pliers comprising:
   two hand levers mechanically coupled with one another by a coupling arrangement that allows relative movement between the two hand levers when force conditions are applied to at least one of the two hand levers;
   at least one of a spring element and a damping element; and
   a drive mechanism comprising a drive mechanism lever, wherein the stripping pliers are configured such that a closing stroke of the stripping pliers that occurs when the force conditions are applied to at least one of the two hand levers comprises:
   a) a cutting stroke during which a closing movement of at least one cutting blade of the stripping pliers directed transverse to a longitudinal axis of an accommodation of the stripping pliers for a cable to be stripped to a closed position takes place, the at least one cutting blade being coupled to a pulling rod of the stripping pliers, wherein in the closed position an insulation of a cable located in the accommodation is partially cut so that a sleeve-like sub-region of the insulation is partially separated from a remainder of the insulation of the cable,
   b) a break-away stroke during which the at least one cutting blade is moved along the longitudinal axis of the accommodation for the cable to be stripped via movement of the pulling rod until the sleeve-like sub-region has fully separated from the remainder of the insulation of the cable, and
   c) a stripping stroke during which the at least one cutting blade is moved along the longitudinal axis of the accommodation for the cable to be stripped via movement of the pulling rod such that the previously fully separated sleeve-like sub-region is slidingly moved along an electrical wire of the cable,
   d) wherein said at least one of a spring element and a damping element is disposed to come into effect approximately at a transition from the break-away stroke to the stripping stroke such that said at least one of a spring element and a damping element
      da) does not influence the force conditions at the stripping pliers during the cutting stroke and the break-away stroke and
      db) produces at least one of a spring force and a damping force counteracting a closure of the hand levers during the stripping stroke,
   e) wherein mechanical boundary conditions of the drive mechanism lever change at the transition from the cutting stroke to the break-away stroke, and wherein during the cutting stroke and the break-away stroke the drive mechanism lever is positioned under a play with respect to said at least one of a spring element and a damping element, the play being removed at the transition from the break-away stroke to the stripping stroke, and wherein during the stripping stroke the drive mechanism lever is biased by said at least one of a spring element and a damping element, an angle of the drive mechanism lever relative to the longitudinal axis of the accommodation of the stripping pliers for the cable to be stripped changing during the stripping stroke.

2. The stripping pliers of claim 1, wherein the drive mechanism lever comprises a roller which starts to contact said at least one of a spring element and a damping element at the transition from the break-away stroke to the stripping stroke.

3. The stripping pliers of one of claim 2, wherein the play between said at least one of a spring element and a damping element and the drive mechanism lever is adjustable.

4. The stripping pliers of claim 3, wherein the play between said at least one of a spring element and a damping element and the drive mechanism lever is adjustable by a change of a position of a rotational axis of the roller of the drive mechanism lever.

5. The stripping pliers of claim 3, wherein the play between said at least one of a spring element and a damping element and the drive mechanism lever is adjustable by an eccentrical rotation of the roller of the drive mechanism lever and the angular fixation of the roller at the drive mechanism lever.

6. The stripping pliers of claim 3, wherein the play between said at least one of a spring element and a damping element and the drive mechanism lever is adjustable by a change of the position of said at least one of a spring element and a damping element.

7. The stripping pliers of claim 1, wherein the drive mechanism lever comprises rollers on each side which have a common rotational axis and each start to contact said at least one of a spring element and a damping element at the transition from the break-away stroke to the stripping stroke.

8. The stripping pliers of one of claim 1, wherein the play between said at least one of a spring element and a damping element and the drive mechanism lever is adjustable.

9. The stripping pliers of claim 8, wherein the play between said at least one of a spring element and a damping element and the drive mechanism lever is adjustable by a change of the position of said at least one of a spring element and a damping element.

10. The stripping pliers of claim 1, wherein said at least one of a spring element and a damping element is formed with an elastomeric body.

11. The stripping pliers of claim 1, wherein said at least one of a spring element and a damping element
    a) is inserted into one of the hand levers and
    b) is secured in said one of the hand levers by the assembly of a lid of a storage device formed in the region of said one of the hand levers and designated for a storage of at least one accessory.

12. The stripping pliers of claim 1, wherein a separating device for completely cutting through a cable is also actuated by the hand levers, wherein said at least one of a spring element and a damping element becomes effective in the last stroke part for the complete cutting through the cable by the separating device.

13. The stripping pliers of claim 1, wherein said at least one of a spring element and a damping element comes into effect when stripping a cable having an outer diameter of at least one of
    a) 7.5 mm after 30% to 50% of the closing stroke of the hand levers,
    b) 3.5 mm after 40% to 60% of the closing stroke of the hand levers and
    c) 1.3 mm after 50% to 65% of the closing stroke of the hand levers.

14. The stripping pliers of claim 1, wherein for a plurality of cable diameters being specified for the stripping pliers the relative position of a transition from the break-away stroke to the stripping stroke for at least one specific cable diameter is located in front of the position of the hand levers for which said at least one of a spring element and a damping element for the first time comes into effect for this specific cable diameter, whereas the relative position of the transition from the break-away stroke to the stripping stroke for at least one other specified cable diameter is positioned behind the position of the hand levers for which said at least one of a spring element and a damping element for the first time comes into effect for the other specified cable diameter.

15. Stripping pliers comprising:
    two hand levers mechanically coupled with one another by a coupling arrangement that allows relative movement between the two hand levers when force conditions are applied to at least one of the two hand levers;
    at least one of a spring element and a damping element; and
    a drive mechanism comprising a drive mechanism lever, the drive mechanism level being a pivoting lever that pivots about a rotational axis of the lever when a rotating moment is applied to the drive mechanism lever, wherein the stripping pliers are configured such that a closing stroke of the stripping pliers that occurs when the force conditions are applied to at least one of the two hand levers comprises:
    a) a cutting stroke during which a closing movement of at least one cutting blade of the stripping pliers directed transverse to a longitudinal axis of an accommodation of the stripping pliers for a cable to be stripped to a closed position takes place, the at least one cutting blade being coupled to a pulling rod of the stripping pliers, wherein in the closed position an insulation of a cable located in the accommodation is partially cut so that a sleeve-like sub-region of the insulation is partially separated from a remainder of the insulation of the cable,
    b) a break-away stroke during which the at least one cutting blade is moved along the longitudinal axis of the accommodation for the cable to be stripped via movement of the pulling rod until the sleeve-like sub-region has fully separated from the remainder of the insulation of the cable and
    c) a stripping stroke during which the at least one cutting blade is moved along the longitudinal axis of the accommodation for the cable to be stripped via movement of the pulling rod such that the previously fully separated sleeve-like sub-region is slidingly moved along an electrical wire of the cable,
    d) wherein said at least one of a spring element and a damping element is disposed to come into effect approximately at a transition from the break-away stroke to the stripping stroke such that said at least one of a spring element and a damping element
        da) does not influence the force conditions at the stripping pliers during the cutting stroke and the break-away stroke and
        db) produces at least one of a spring force and a damping force counteracting a closure of the hand levers during the stripping stroke,
    e) wherein mechanical boundary conditions of the drive mechanism lever change at the transition from the cutting stroke to the break-away stroke, and wherein during the cutting stroke and the break-away stroke the drive mechanism lever is positioned under a play with respect to said at least one of a spring element and a damping element, the play being removed at the transition from the break-away stroke to the stripping stroke, and wherein during the stripping stroke the drive mechanism lever is biased by said at least one of a spring element and a damping element, an angle of the drive mechanism lever relative to the longitudinal axis of the accommodation of the stripping pliers for the cable to be stripped changing during the stripping stroke.

16. Stripping pliers comprising:
two hand levers mechanically coupled with one another by a coupling arrangement that allows relative movement between the two hand levers when force conditions are applied to at least one of the two hand levers;
at least one of a spring element and a damping element; and
a drive mechanism comprising a drive mechanism lever, the drive mechanism lever being a pressure lever and having a base body, a first end of the base body being linked by a joint to one of the hand levers, a second end of the base body being disposed to bias a pulling rod of the stripping pliers away from a bit of tongues of the stripping pliers at an end of a cutting stroke, and wherein the stripping pliers are configured such that a closing stroke of the stripping pliers that occurs when the force conditions are applied to at least one of the two hand levers comprises:
a) the cutting stroke during which a closing movement of at least one cutting blade of the stripping pliers directed transverse to a longitudinal axis of an accommodation of the stripping pliers for a cable to be stripped to a closed position takes place, the at least one cutting blade being coupled to a pulling rod of the stripping pliers, wherein in the closed position an insulation of a cable located in the accommodation is partially cut so that a sleeve-like sub-region of the insulation is partially separated from a remainder of the insulation of the cable,
b) a break-away stroke during which the at least one cutting blade is moved along the longitudinal axis of the accommodation for the cable to be stripped via movement of the pulling rod until the sleeve-like sub-region has fully separated from the remainder of the insulation of the cable and
c) a stripping stroke during which the at least one cutting blade is moved along the longitudinal axis of the accommodation for the cable to be stripped such that the previously fully separated sleeve-like sub-region is slidingly moved along an electrical wire of the cable,
d) wherein said at least one of a spring element and a damping element is disposed to come into effect approximately at a transition from the break-away stroke to the stripping stroke such that said at least one of a spring element and a damping element
da) does not influence the force conditions at the stripping pliers during the cutting stroke and the break-away stroke and
db) produces at least one of a spring force and a damping force counteracting a closure of the hand levers during the stripping stroke,
e) wherein mechanical boundary conditions of the drive mechanism lever change at the transition from the cutting stroke to the break-away stroke, and wherein during the cutting stroke and the break-away stroke the drive mechanism lever is positioned under a play with respect to said at least one of a spring element and a damping element, the play being removed at the transition from the break-away stroke to the stripping stroke, and wherein during the stripping stroke the drive mechanism lever is biased by said at least one of a spring element and a damping element, an angle of the drive mechanism lever relative to the longitudinal axis of the accommodation of the stripping pliers for the cable to be stripped changing during the stripping stroke.

* * * * *